Patented Feb. 7, 1950

2,496,907

UNITED STATES PATENT OFFICE 2,496,907

PRODUCTION OF DISPERSIONS CONTAINING SOLID POLYMERS OF ETHYLENE

Fred Dawson, Manchester, England, assignor to Imperial Chemical Industries Limited, a corporation of Great Britain No Drawing. Application December 22, 1947, Serial No. 793,315. In Great Britain December 20, 1946

4 Claims. (Cl. 260—8)

This invention relates to the production of dispersions and more particularly to the production of concentrated dispersions of polythenes or derivatives of polythenes or ethylene interpolymers in aqueous media.

In British specification No. 515,582 there is described and claimed a process for the production of dispersions of polythenes, derivatives of polythenes or ethylene interpolymers which comprises dissolving the said polymer in a volatile organic solvent not miscible or only sparingly miscible with water, emulsifying the solution in an aqueous medium in the presence of a dispersing or emulsifying agent or agents and/or in the presence of the components of dispersing or emulsifying agents, if desired, in the presence of a protective colloid, and subsequently subjecting the mixture to conditions whereby the volatile organic solvent is removed by volatilisation. The preferred dispersing or emulsifying agents are stated to be the alkali metal, ammonium or organic amine salts of aliphatic carboxylic acids (containing more than 6 carbon atoms).

The polymer dispersions so-obtained are dilute, containing of the order of 10% by weight of polymer, and heretofore the concentration thereof has only been achieved by evaporation of the water. This operation requires strict temperature control in order to avoid flocculation of the dispersion. If, however, the process described in British specification No. 515,582 is carried out with the use of the preferred dispersing or emulsifying agents and in the presence of a water-soluble protein, for example glue or gelatine as protective colloid this difficulty may be obviated and the dispersion may be readily concentrated by the process hereinafter described.

Thus, according to the present invention there is provided a process for the concentration of dispersions, obtainable by carrying out the process described in British specification No. 515,582 with the use of the preferred dispersing or emulsifying agents and in the presence of a water-soluble protein, for example glue or gelatine as a protective colloid, which comprises acidifying the dilute dispersion to a pH value below the isoelectric point of the protein, removing water by mechanical methods from the so-flocculated dispersion and reconstituting the dispersion by adjusting the pH to a value greater than the isoelectric point of the protein.

In preparing the dilute dispersions by the process described in British Specification No. 515,582 it is preferred to use as additional dispersing agent, the condensation product of a fatty alcohol with ethylene oxide, for example the condensation product of cetyl alcohol with 4 molecular proportions of ethylene oxide; the volatilisation of the solvent may conveniently be carried out in the presence of an anti-foaming agent.

Mechanical methods which can be used for removing water from the flocculated dilute dispersion include filtration, centrifuging or skimming.

After removal of water, the dispersion is readily reconstituted by addition with stirring of sufficient alkali to raise the pH of the dispersion to a value greater than the isoelectric point of the protein.

By the process of this invention concentrated dispersions are obtained containing as much as 50% by weight, or even more, of polymer.

The invention is illustrated but not limited by the following example in which parts are by weight.

Example 240 parts of polythene (viscosity not above 100,000 poises when measured at 130° C.), 25 parts of stearic acid, 6 parts of the condensation product of cetyl alcohol with 4 molecular proportions of ethylene oxide and 2160 parts of trichloroethylene are mixed and the mixture is heated under a reflux condenser to a temperature of 70–80° C. until all the polymer is dissolved. 5.5 parts of potassium hydroxide and 4 parts of skin gelatine are dissolved in 1440 parts of water and heated to 80° C., and added with stirring to the hot solution of the polymer. The coarse emulsion so obtained is passed through a colloid mill (with an aperture between rotor and stator of 1/100 inch and rotor revolving at 30,000 R. P. M.) and transferred to a distillation vessel equipped with an agitator. The trichloroethylene is removed by volatilisation at a temperature of 70° C. and under a pressure of 735 mm. of mercury. The distillate is passed through a continuous separator and the water removed during the distillation is returned to the distillation vessel. The time required for complete removal of the trichloroethylene is 12 hours. The resulting dilute aqueous polymer dispersion is flocculated by the addition of 80 parts of glacial acetic acid (pH 4.0 approximately) and water is removed by filtration until the press-paste contains 30–50% of polymer. After removal from the press the paste is made alkaline by the addition with stirring of 64 parts of ammonia solution (specific gravity 0.880). There is thus obtained a concentrated aqueous dispersion of polythene.

I claim:
1. The process of preparing concentrated dispersions of solid polymers of ethylene which comprises dissolving the solid polymer in a water-immiscible volatile organic solvent, emulsifying the solution in an aqueous medium in the presence of an emulsifying agent and a proteinaceous protective colloid, removing the volatile solvent, acidifying the dilute dispersion to a pH value below the isoelectric point of the proteinaceous colloid, mechanically separating water from the flocculated dispersion and reconstituting the dispersion by adjusting the pH thereof to a value greater than the isoelectric point of the proteinaceous colloid.

2. The process of claim 1 in which the proteinaceous colloid is gelatine.

3. The process of claim 1 in which the water is separated by filtering.

4. The process of claim 1 in which 240 parts of a solid polymer of ethylene having a viscosity below 100,000 poises at 130° C., 25 parts of stearic acid, 6 parts of the condensation product of cetyl alcohol with 4 molecular proportions of ethylene oxide and 2160 parts of trichloroethylene are mixed and refluxed until the polymer is dissolved, adding 5.5 parts of potassium hydroxide and 4 parts of gelatine, colloiding the coarse emulsion so formed, removing the trichloroethylene by volatilization, flocculating the dilute aqueous dispersion by adding 80 parts of glacial acetic acid, filtering off the water until the residue contains 30 to 50% polymer and thereafter adding 64 parts of a solution of ammonia having a specific gravity of 0.880.

FRED DAWSON.

REFERENCES CITED

The following references are of record in the file of this patent:

UNITED STATES PATENTS

| Number | Name | Date |
|---|---|---|
| 2,290,794 | Alvarado | July 21, 1942 |